United States Patent
Lanier

(10) Patent No.: US 11,895,167 B2
(45) Date of Patent: *Feb. 6, 2024

(54) CONTROLLED USER INTERFACE TRANSITIONS USING SEATING POLICIES THAT RANK USERS ADDED TO COMMUNICATION SESSIONS

(71) Applicant: MICROSOFT TECHNOLOGY LICENSING, LLC, Redmond, WA (US)

(72) Inventor: Jaron Lanier, Berkeley, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/751,652

(22) Filed: May 23, 2022

(65) Prior Publication Data
US 2022/0400142 A1 Dec. 15, 2022

Related U.S. Application Data

(63) Continuation of application No. 17/163,326, filed on Jan. 29, 2021, now Pat. No. 11,374,988.

(51) Int. Cl.
*H04L 65/401* (2022.01)
*H04L 65/1069* (2022.01)
*H04L 65/1083* (2022.01)
*H04L 65/4038* (2022.01)

(52) U.S. Cl.
CPC ...... *H04L 65/4015* (2013.01); *H04L 65/1069* (2013.01); *H04L 65/1086* (2013.01); *H04L 65/4038* (2013.01)

(58) Field of Classification Search
CPC ............ H04L 65/4015; H04L 65/1069; H04L 65/1086; H04L 65/4038
See application file for complete search history.

(56) References Cited

U.S. PATENT DOCUMENTS

| 7,119,829 | B2* | 10/2006 | Leonard | H04N 7/142 348/E7.083 |
|---|---|---|---|---|
| 11,082,661 | B1* | 8/2021 | Pollefeys | H04N 7/15 |
| 11,245,735 | B1* | 2/2022 | Kwatra | H04L 65/1089 |
| 11,394,925 | B1* | 7/2022 | Faulkner | G06F 3/013 |
| 11,563,779 | B2* | 1/2023 | Copley | H04L 65/403 |
| 2007/0279484 | A1* | 12/2007 | Derocher | H04N 7/15 348/E7.083 |

(Continued)

*Primary Examiner* — Dhairya A Patel
(74) *Attorney, Agent, or Firm* — Scott Y. Shigeta; Newport IP, LLC

(57) ABSTRACT

The techniques disclosed herein provide controlled user interface transitions for private breakout communication sessions. A system provides a Together Mode user interface that gives participants of a communication session a feeling that they are in the same room. When a person joins a communication session, a system uses a seating policy to determine a location of that user. That user is placed near or next to a select user meeting one or more conditions. If a number of people join the communication session, each person is ranked according to an organizational chart and each person is positioned and ordered relative to the select user according to each person's rank. The system configures the updated user interface arrangement to maintain the position of the select group of the participants.

17 Claims, 14 Drawing Sheets

(56) References Cited

U.S. PATENT DOCUMENTS

| | | | | |
|---|---|---|---|---|
| 2009/0109129 A1* | 4/2009 | Cheong | ................... | G09G 5/10 |
| | | | | 345/20 |
| 2011/0025819 A1* | 2/2011 | Gorzynski | ............. | H04N 7/147 |
| | | | | 348/E7.083 |
| 2011/0225514 A1* | 9/2011 | Goldman | ................ | G06T 19/00 |
| | | | | 715/757 |
| 2012/0200661 A1* | 8/2012 | Mock | ....................... | H04N 7/15 |
| | | | | 348/14.09 |
| 2012/0262537 A1* | 10/2012 | Baker | ....................... | H04N 7/15 |
| | | | | 348/E7.083 |
| 2015/0049162 A1* | 2/2015 | Kurupacheril | ....... | H04N 23/698 |
| | | | | 348/14.08 |
| 2017/0195427 A1* | 7/2017 | Choquette | ................ | H04L 67/56 |
| 2017/0302709 A1* | 10/2017 | Jones | ................. | G06F 3/04817 |
| 2017/0339372 A1* | 11/2017 | Valli | ..................... | G06T 15/005 |
| 2018/0098029 A1* | 4/2018 | Cassini | ................... | H04N 7/152 |
| 2018/0139253 A1* | 5/2018 | Ruetschi | ............... | H04M 3/565 |
| 2019/0102396 A1* | 4/2019 | Pan | ..................... | H04M 1/2746 |
| 2019/0173682 A1* | 6/2019 | Kempf | ................... | H04N 7/152 |
| 2020/0219216 A1* | 7/2020 | Davis | ................. | H04L 12/1822 |
| 2020/0281063 A1* | 9/2020 | Kittleman | ............. | F21V 33/006 |
| 2020/0322395 A1* | 10/2020 | Copley | .................. | H04N 7/157 |
| 2021/0084259 A1* | 3/2021 | Kies | ..................... | A63F 13/655 |
| 2021/0385263 A1* | 12/2021 | Churchill | ............. | G06F 3/0482 |
| 2022/0031073 A1* | 2/2022 | Kinoshita | ............ | A47C 3/0255 |
| 2022/0083922 A1* | 3/2022 | Koslu | ................... | G06T 15/205 |
| 2023/0274412 A1* | 8/2023 | Nadin Pinheiro | ...... | G06T 7/001 |
| | | | | 382/103 |
| 2023/0281278 A1* | 9/2023 | Fernandez Garcia | ....................... | |
| | | | | G06F 21/645 |
| | | | | 705/59 |

* cited by examiner

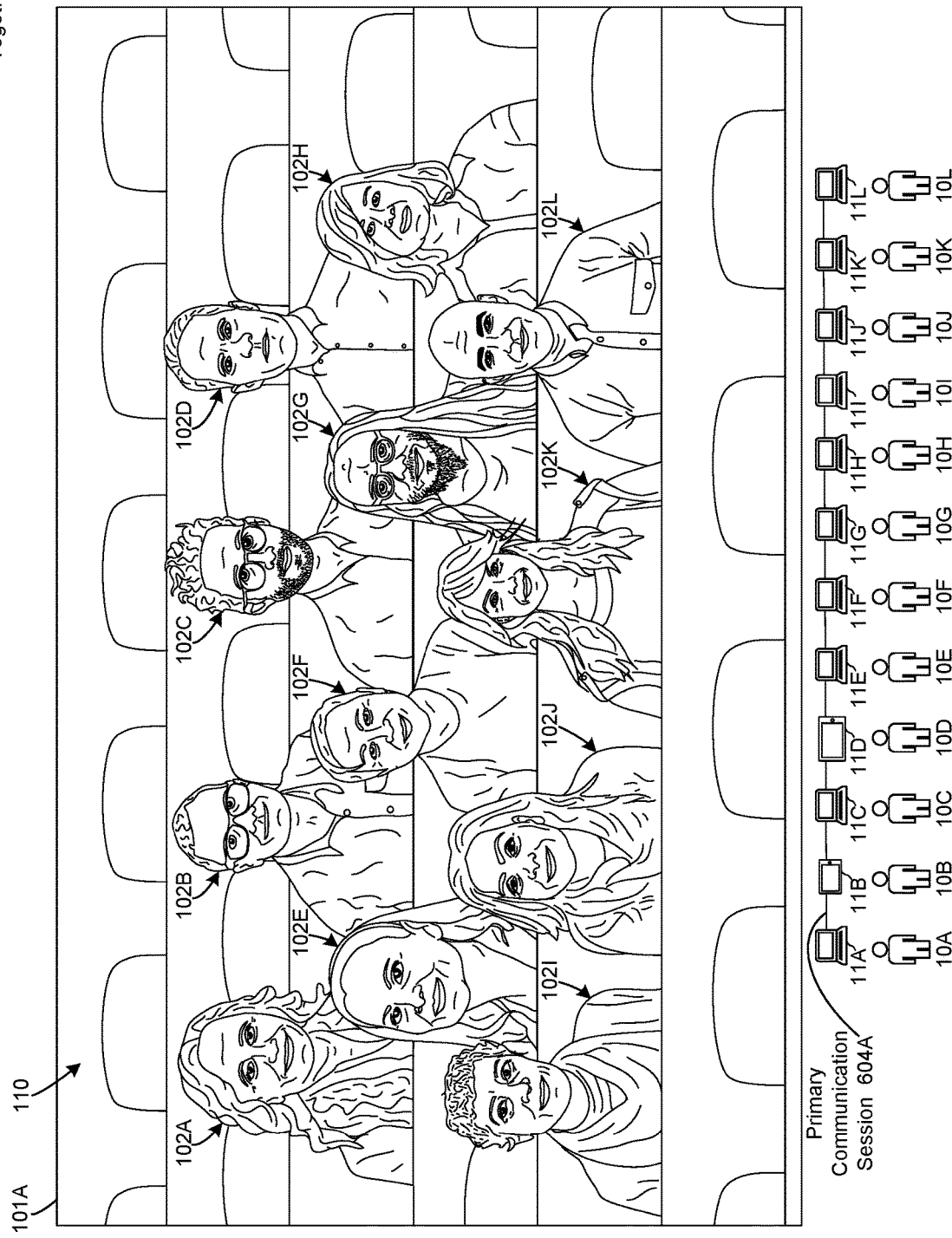

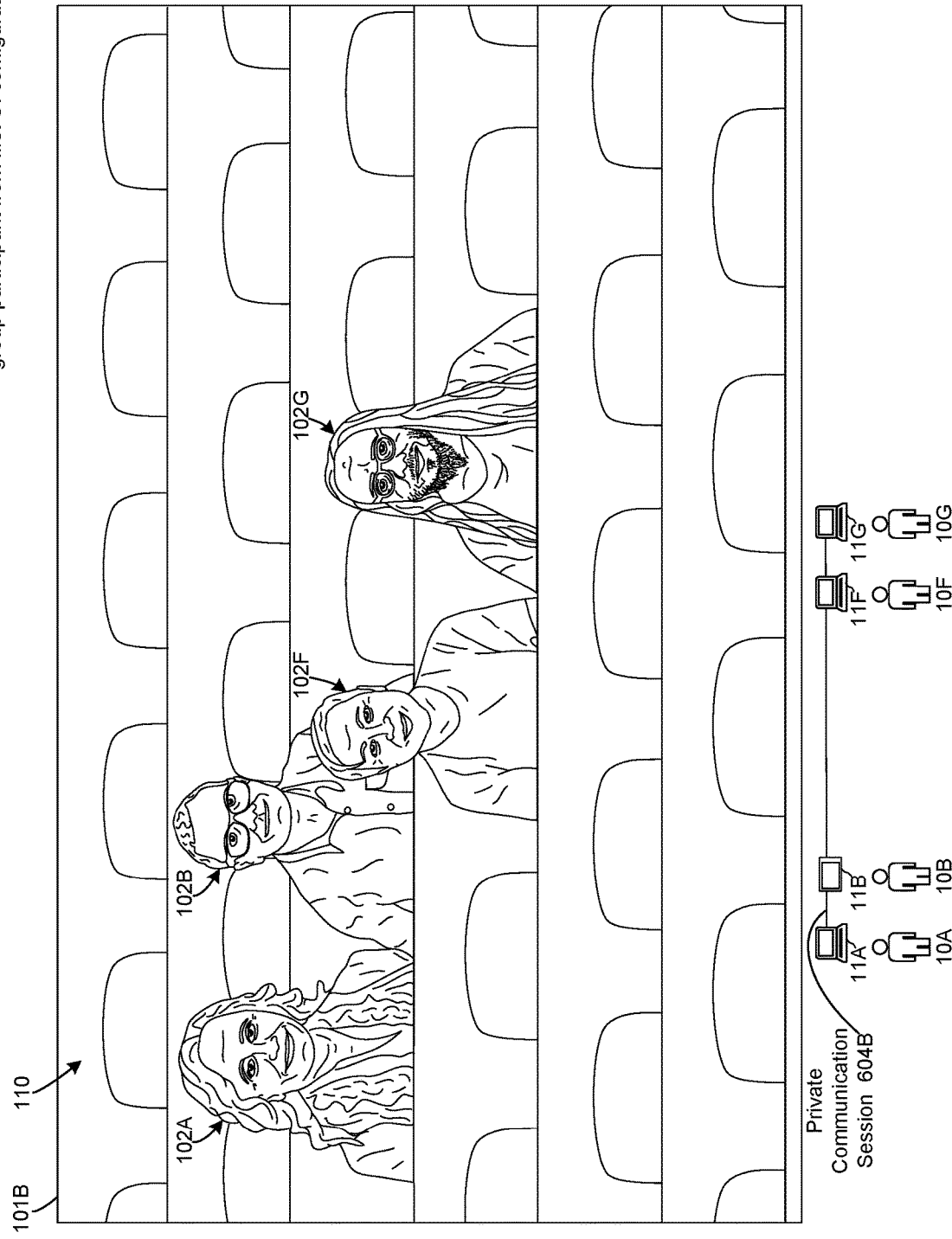

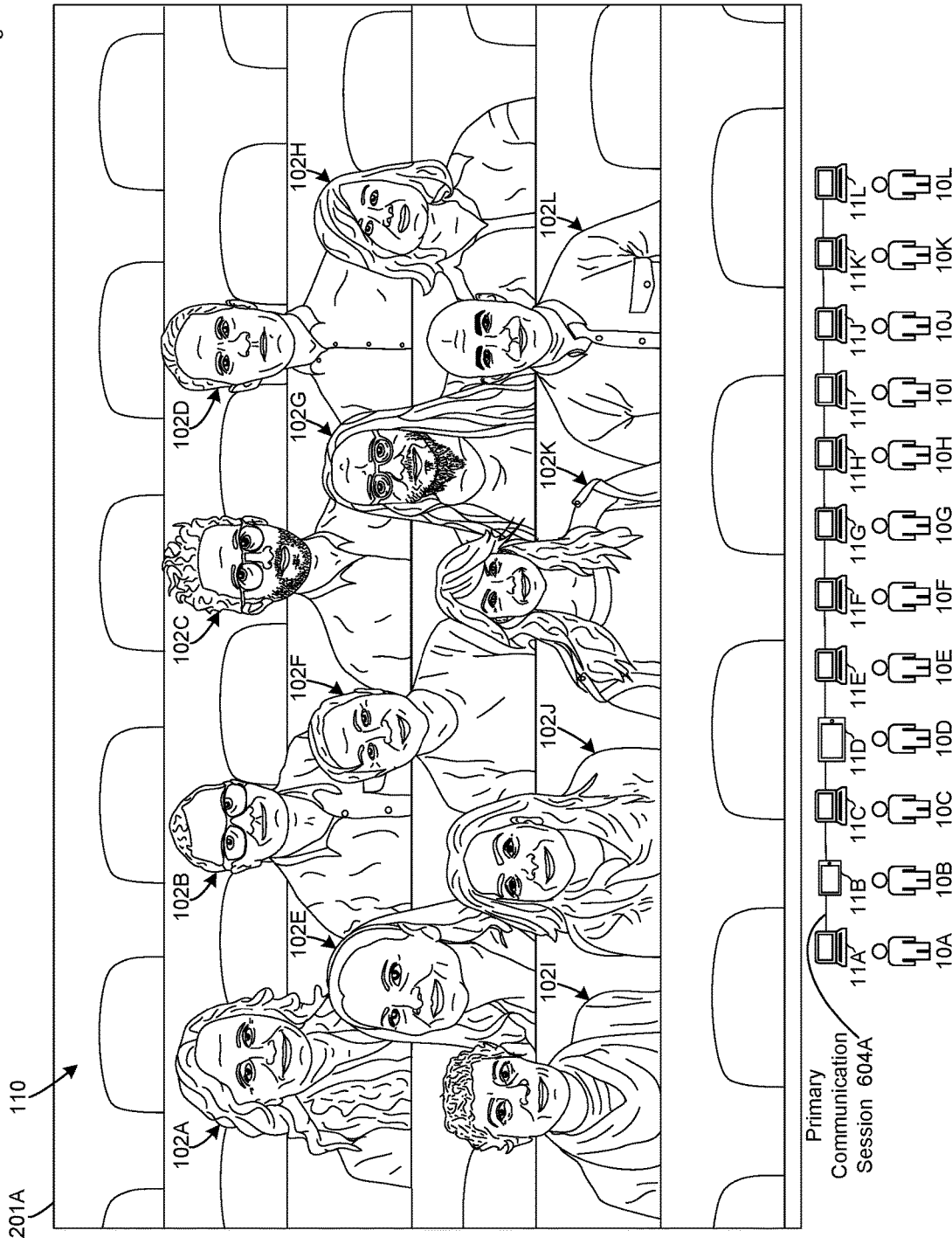

UI Configuration 101B of Breakout Group. The UI 101B maintaining the position of each breakout group participant from first UI configuration 101A. This embodiment shows a new environment

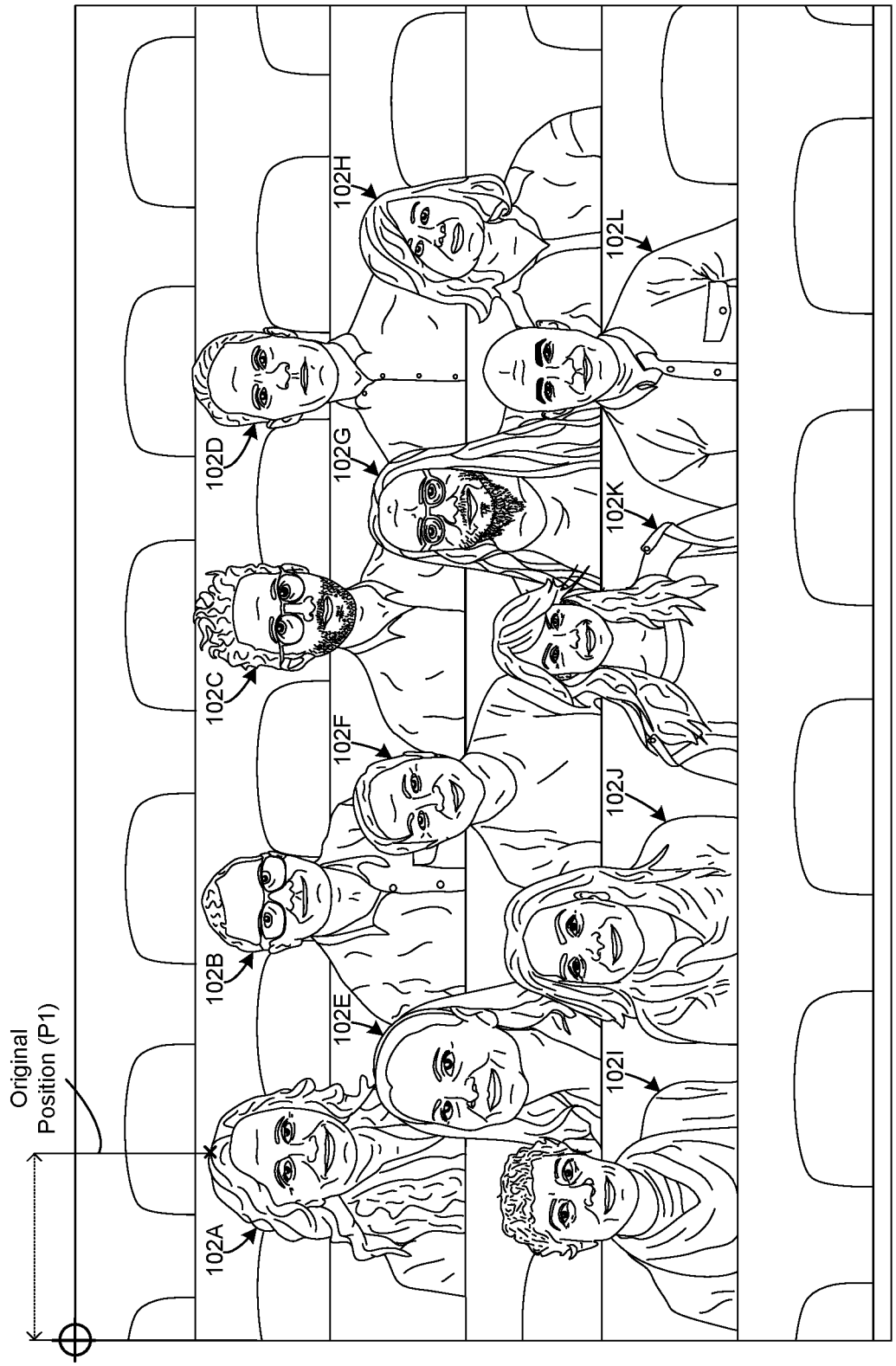

Together Mode UI with Virtual Lighting Scheme

CONTROLLED USER INTERFACE TRANSITIONS USING SEATING POLICIES THAT RANK USERS ADDED TO COMMUNICATION SESSIONS

CROSS REFERENCE TO RELATED APPLICATIONS

This application is a continuation of and claims priority to U.S. application Ser. No. 17/163,326, entitled "CONTROLLED USER INTERFACE TRANSITIONS FOR PRIVATE BREAKOUT COMMUNICATION SESSIONS," filed Jan. 29, 2021, which is incorporated herein in its entirety.

BACKGROUND

There are a number of communication systems that allow users to collaborate. For example, some systems allow people to collaborate using live video streams, live audio streams, and other forms of text-based or image-based mediums. Participants of a communication session can share a video stream that is displayed with a group of people. In some existing systems, user interface arrangements may show the live video streams in a grid format.

Although there are a number of systems that allow users to collaborate and share video streams, such systems still have a number of shortcomings. For instance, systems that display video streams in a traditional grid format make it difficult for participants to interpret many non-verbal social cues during a video conference meeting. It has been proven that non-verbal social cues are used by participants during in-person meetings to guide various types of interactions. For example, in an in-person meeting, people are constantly interpreting others' eye movements, posture, how their heads are tilted and more, and attributing meaning to those non-verbal cues. Researchers have called these interactions an intricate dance where, for instance, one person would turn their head and the other person might respond and lean back. But on a video call using a traditional grid user interface arrangement, those movements aren't diagnostic, meaning they're not providing accurate information about what's going on. One person might look at another for a response, but since everyone is organized differently on each participant's screen in a grid view, it's not clear to anyone else whom they're actually looking at.

Such shortcomings of existing systems can lead to user fatigue. Participants watching a video conference displayed in a grid format have to focus continuously on a screen to extract relevant information to stay engaged. Each person may have to expend a great deal of energy looking for non-verbal cues, which can create a heavy cognitive load for each participant.

In another example, some video conference systems may not display participants at an optimal size. During a meeting, a presenter may be displayed in a rendering that is much larger than other participants. In such scenarios, when a person's face looms large in another person's visual sphere, it generally causes a person to trigger a fight or flight response. In this state, when that person is alert and hyperaware, that causes amplified reactions that are automatic and subconscious, and that person's heart rate goes up. Thus, in such user interface arrangements, a user experience can be overwhelming for a person's nervous system to handle, which can further contribute to user fatigue.

These shortcomings lead to less than optimal interactions between a computing device and a user. In addition, such shortcomings of existing systems can lead to a loss in user engagement. Computing devices that do not promote user engagement, or worse, contribute to a loss of user engagement, can lead to production loss and inefficiencies with respect to a number computing resources. For instance, when a user becomes fatigued or disengaged, that user may need to refer to recordings or other resources when shared content that is shared in a live meeting is missed or overlooked. Missed content may need to be re-sent when viewers miss salient points or cues during a live meeting. Viewers may also have to re-watch content when they miss salient points or non-verbal social cues during a viewing of a recorded presentation. Such activities can lead to inefficient use of a network, processor, memory, or other computing resources. Thus, there is an ongoing need to develop improvements to help make the user experience more like an in-person meeting and more engaging.

SUMMARY

The techniques disclosed herein provide controlled user interface transitions for private breakout communication sessions. A system provides a Together Mode user interface that gives participants of a communication session a feeling that they are in the same room. As described in more detail below, the Together Mode user interface allows users to readily communicate nonverbal social cues during a live video conference session. When a person joins a communication session, a system uses a seating policy to determine a location of that user. That user is placed near or next to a select user meeting one or more conditions. If a number of people join the communication session, each person is ranked according to an organizational chart and each person is positioned and ordered relative to the select user according to each person's rank. The system configures the updated user interface arrangement with the newly added people to maintain the position of the select group of the participants while the new people are added. By maintaining the position of the participants of the private communication session in this transition, the system can provide a user interface transition that enables the participants of the private communication session to maintain a cognitive stream for interpreting nonverbal social cues that were provided in the original user interface arrangement.

The Together Mode user interface provides a number of benefits that are based on cognitive and social science foundations. As described in more detail below, the human brain is optimized to know where people are physically positioned. The Together Mode user interface is configured to allow users to use this characteristic of the human brain by arranging people in an environment that allows users to see each other through a large virtual mirror. This arrangement helps reduce fatigue during communication sessions. The techniques disclosed herein further those benefits by enabling a system to apply the Together Mode features to user interface transitions between communication sessions. By keeping meeting participants in the same position during a transition between a primary communication session UI and a breakout communication session UI, the system allows people to readily find one another. As also described in more detail below, this feature enables a system to function in a way that is consistent with the natural function of the human brain. More specifically, a system can configure user interface transitions that flow with the natural cognition of the human brain. This can reduce fatigue and cognitive load that may be caused by grid user interface arrangements of some existing communication systems.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1A shows aspects of a Together Mode user interface used for a primary communication session.

FIG. 1B shows aspects of a Together Mode user interface used for a private breakout communication session.

FIG. 2A shows aspects of a Together Mode user interface used for a primary communication session.

FIG. 4A shows aspects of a Together Mode user interface used for a primary communication session and a position of a user relative to a reference point.

DETAILED DESCRIPTION

Figure 2B:
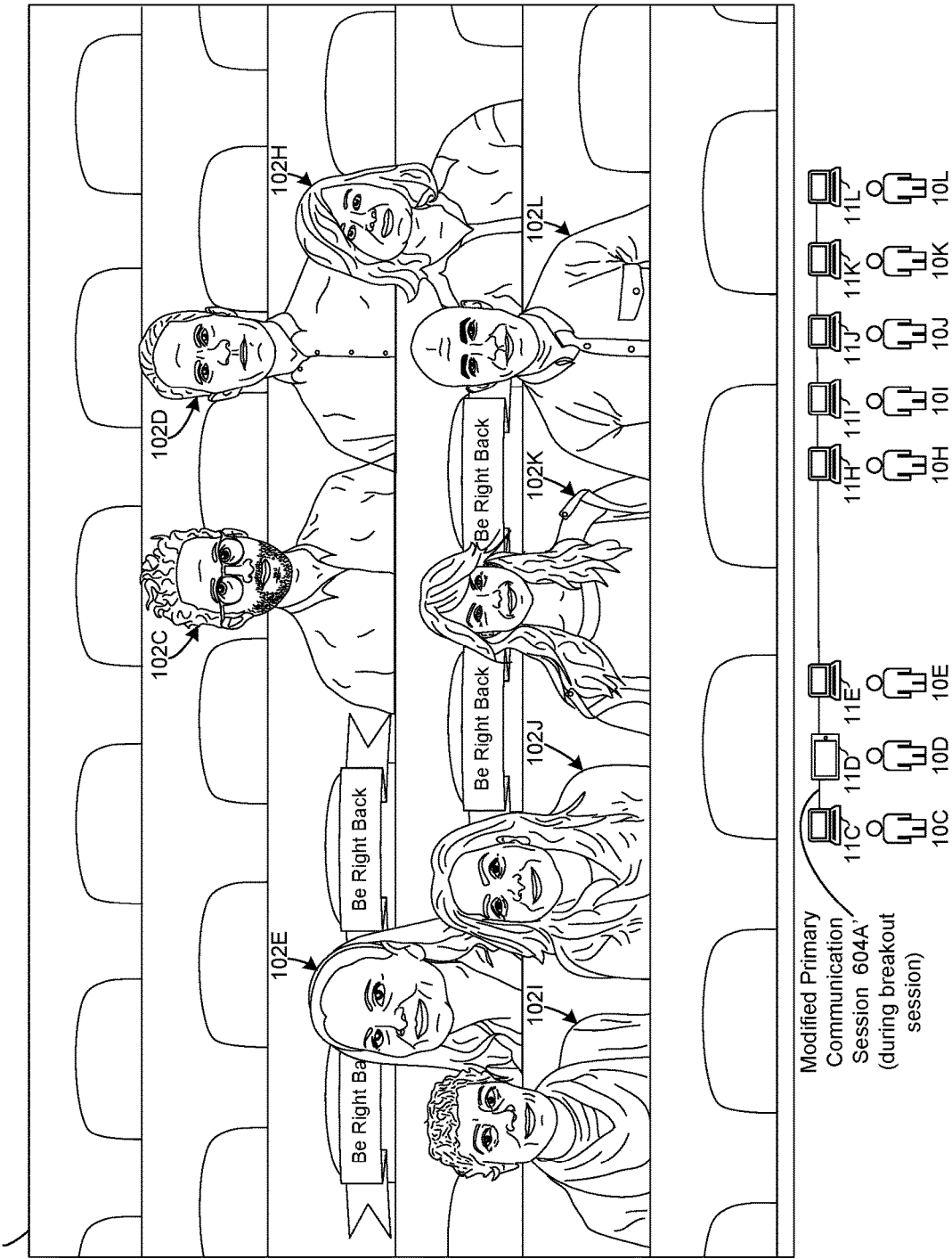
FIG. 2B shows aspects of a Together Mode user interface used for a primary communication session after renderings for users are removed for a private breakout communication session.

The techniques disclosed herein provide systems for optimizing the use of computing resources and to improve user engagement by controlling the position of video stream renderings during user interface transitions for private breakout communication sessions. The techniques disclosed herein also utilize a Together Mode user interface that can reduce fatigue and promote user engagement. The disclosed techniques address a number of technical problems. For example, the disclosed techniques address inefficiencies and problems that are encountered in existing communication systems that utilize box grid user interface arrangements for displaying individual renderings participants of a video conference.

The display of video streams in traditional box grid formats make it difficult for participants to interpret many non-verbal social cues during a video conference. These types of gestures are used during in-person meetings to guide various types of interactions. There are a number of different types of non-verbal social cues such as head nods, facial cues, body language, etc. These non-verbal social cues communicate many different emotions and intentions. For instance, non-verbal social cues can show that a person has an issue, or that a person wants to speak, or that a person agrees or does not agree. In some cases, non-verbal social cues are so automatic that audience members can even synchronize their breathing pattern to a speaker's breathing pattern. During an in-person meeting, people are constantly interpreting others' eye movements, posture, how their heads are tilted and more, and attributing meaning to those non-verbal cues. But on a video call using a traditional user interface with a grid arrangement, those movements aren't diagnostic, meaning they're not providing accurate information about what's going on. Such shortcomings of existing systems can lead to user fatigue and often lead to a user becoming disengaged.

The Together Mode features disclosed herein provide a number of benefits that helps each participant of a virtual meeting communicate non-verbal cues. For instance, a Together Mode user interface can be configured to give participants of a video conference the impression that everyone is looking at the entire group in a big virtual mirror. When using the Together Mode user interface, participants of a video conference can look at one another, lean into one another, etc.

The Together Mode user interface changes the whole user experience compared to the traditional box grid user interface arrangement. This is possible because people's brains are used to being aware of others based on their location, and the Together Mode UI is designed to manage the location of the users. The way in which people are positioned in the Together Mode UI can help make it easier for everyone to see non-verbal social cues and tell how they are responding to each other. The Together Mode UI enables participants to utilize social and spatial awareness mechanisms in the brain. This enables a participant's brain to function more naturally and provide a richer user experience that does not cause fatigue. When viewing a video conference through the Together Mode UI, users can practice some of the natural social signaling they would do in real life, e.g., social signaling that may occur during in-person meetings.

In another example of a technical effect of the present disclosure, the Together Mode UI enables users to maintain eye contact. This helps with a known issue with some existing grid-based video conferencing systems that have issues with gaze misalignment. While video conferencing systems have grown more robust and stable over the decades, there have been no real improvements to the user experience that were viable for widespread use. The grid format has fundamentally been the same over the years and such formats have been known to cause video-call fatigue. For example, if someone's face looms large in a person's visual sphere in real life, it generally causes a person to trigger a fight or flight response. In this state, that person is alert and hyper-aware, which causes amplified reactions that are automatic and subconscious, and that person's heart rate can be unnecessarily elevated. In video calls, there's often a grid with multiple faces filling the boxes, some that may be scaled at disproportionate sizes. In those traditional UI arrangements, that user experience can be overwhelming for a person's nervous system to handle.

The Together Mode UI can provide added context to user gestures that enables more effective communication by positioning renderings of individuals within a virtual environment and maintaining positions of renderings of each user. For example, when users know that they are positioned next to a person within a seating arrangement, head movements have actual meaning to each person. Gestures and subtle movements of each person have an in-person meeting feel and movements do not create the confusion that occurs in traditional grid format UI's. In some configurations, the Together Mode UI can involve a process for scaling the renderings of individuals to help give the appearance that everyone is the same room. These features can help a system cause less confusion and also help reduce fatigue. These benefits can help make a user's interaction with a computer more accurate and realistic, while providing more effective communication between users.

The Together Mode UI also enables users to readily locate individuals and interpret non-verbal social cues using natural cognitive brain functions. Such features can mitigate user fatigue and promote user engagement, as participants of a communication session are less likely to miss salient information and reduce the need for users to refer to recordings, alternative communication methods, or prolong meetings, all of which can lead to inefficient use of computing resources. The benefits of the Together Mode features can mitigate the need for redundant use of network, processor, memory, or other computing resources.

These benefits can also reduce the likelihood of inadvertent user inputs and other errors that may result when a user has to review recordings or communicate with others when salient information is missed due to a lack of user engagement. When a participant of a video conference misses salient information due to a lack of user engagement, a system may be required to retrieve, communicate, and process multiple copies of information.

Referring now to FIG. 1A, aspects of a Together Mode user interface are shown and described below. In this example, individual computing devices 11 participating in a communication session 604A each display of a primary communication session user interface 101A comprising individual renderings 102A-102L of the video streams of a plurality of participants 10A-10L respectively operating remote computing devices 11A-11L. In this example, the individual renderings 102A-102L each have a position relative to a seating configuration of a virtual environment 110. This example is provided for illustrative purposes, as the virtual environment 110 can be in any form, such as an office, meeting room, auditorium, stadium, etc. The user interface shown in FIG. 1A can be generated for display at any one of the devices and can display any number of participants.

In some configurations, the Together Mode user interface provides the same view for each person in a meeting and the seating arrangement for the participants does not change over time. More specifically, the arrangement of the user renderings, e.g., the order and spacing between the renderings, are the same across each device. This is unlike some traditional grid views that show participants' videos in different locations on each person's screen and that move the boxes around during the call based on who's speaking or who joins or leaves a meeting. Since an area of the brain is devoted to spatial memory, Together Mode's consistency provides a number of benefits to reduce the cognitive load and fatigue to each user of a video conference.

Together Mode involves a user interface arrangement that gives participants of a communication session a feeling that they are in the same room. In general, when an application enables Together Mode, the application generates a user interface that arranges the participants of a communication session in one shared space. In some configurations, images of each participant can be arranged according to a seating arrangement of a virtual environment. This user interface arrangement enables each participant to feel more connected to the other participants. This user interface arrangement can be used for meetings, coffee breaks, corporate all-hands meetings, sporting events, or any other type of get together.

In some configurations, the individual renderings 102 of each participant 10 are generated using a conforming crop filter that removes any component of an image that includes a background from a participant's surrounding environment. Each video stream generated by a camera at a participant's device 11 is received and processed to produce a rendering 102 that is shaped according to the image of the user and any accessories that the user may be wearing, such as a hat, jewelry, etc. Thus, when the shaped image of the participant is positioned over an image of a virtual environment, the system can give the appearance that the participant is in the virtual environment with other participants of a communication session. These shaped renderings 102 allow viewers to focus on the depicted person without the distraction of an image of their physical surroundings.

The size of each rendering 102 of the participants may also be normalized to give the appearance that the participants are in the same room. In some examples, the renderings 102 can be resized or scaled within a threshold size difference of one another, or the renderings 102 can be resized or scaled according to predetermined dimensions suited for a particular virtual environment. For a group meeting, for example, each rendering of each participant can be scaled to fit depicted seats, desks, etc. These adjustments enable a system to give the appearance that each person is sitting together within a given setting, e.g., an office, meeting room, stadium, etc. These features are an advancement over the traditional user interface arrangements that only have a grid of boxes. The Together Mode features help create an environment that has a profound impact on the feel of a video conference.

The techniques disclosed herein also control the position of user renderings during a transition from a first user interface arrangement to a second user interface arrangement. An example of this transition is shown in FIG. 1A and FIG. 1B. In this example, a system can maintain the position of select user renderings during a user interface transition from a primary communication session, e.g., primary meeting, user interface 101A to a private breakout communication session user interface 101B. For illustrative purposes, the first user 10A, second user 10B, sixth user 10F and seventh user 10G are selected to participate in a private communication session, also referred to herein as a "breakout session" or "breakout communication session." Correspondingly, the breakout communication session user interface 101B displays a first rendering 102A of the first user 10A, a second rendering 102B of the second user 10B, a sixth rendering 102F of the sixth user 10F, and a seventh rendering 102G of the seventh user 10G. As shown in FIG. 1B, the breakout communication session user interface 101B that maintains positions of each rendering of the select set of participants 10A, 10B, 10F, 10G relative to each person's position in the primary meeting user interface 101A. By maintaining the positions of the select set of participants for the private communication session, viewers can maintain their cognitive stream used for interpreting non-verbal social cues. This can help reduce user fatigue and helps a computing system operate more consistently with a viewer's natural cognitive process.

In some configurations, the transition can be initiated by receiving input data indicating a select set of participants 10A, 10B, 10F, 10G to communicate in a private communication session 604B. The input can be in the form of a user input indicating the identities of the select set of participants, or the input can be initiated by a computing device based on the detection of one or more criteria, e.g., that at least one person of the select set of participants has shared content having privacy settings and the identities of the select set of participants.

In response to receiving the input data indicating the select set of participants 10A, 10B, 10F, 10G to communicate in the private communication session 604B, one or more computing devices cause a subset of the remote computing devices 11A, 11B, 11F, 11G each associated with the select set of participants 10A, 10B, 10F, 10G to exclusively communicate through the private communication session 604B. The private communication session can include live video, live audio, and private messages and content sharing exclusively for the select set of participants. In response to the input data indicating the select set of participants, one or more computing devices also cause a transition from the display of the primary communication session user interface 101A (FIG. 1A) to the breakout communication session user interface 101B (FIG. 1B) that maintains positions of each rendering 102 of the select set of participants 10A, 10B, 10F, 10G.

As shown in FIG. 2A and FIG. 2B, the system also maintains the positions of the remaining users who are not selected for the private communication session 604B. FIG. 2A shows the same primary meeting user interface 201A shown in FIG. 1A. However, in this example, in response to the select set of participants 10A, 10B, 10F, 10G leaving the communication session 604A, one or more devices cause the computing devices 11C-11E and 11H-11L associated with the remaining users 10C-10E and 10H-10L to transition from the display of the primary communication session user interface 201A to a reserved seating user interface 201B configured remove the renderings of the select set of participants 10A, 10B, 10F, 10G. In addition, the remaining users 10C-10E and 10H-10L can communicate privately through a modified communication session 604A', which does not allow communication with the select set of participants 10A, 10B, 10F, 10G. The reserved seating user interface 201B is also configured to restrict the placement of renderings of new participants in the positions that were occupied by the select set of participants 10A, 10B, 10F, 10G who left the primary communication session 604A for the private communication session 604B. Thus, if any new participant joins the session while the others are out on the private breakout session, the new participants will be positioned in positions, e.g., seats, other than the reserved positions. As individuals of the select set of participants 10A, 10B, 10F, 10G return to the primary communication session, they will be placed back in their original position regardless if new participants join the session. This feature allows viewers to maintain a visual alignment between the depicted participants, which helps the system operate in a manner that is consistent with a viewer's natural cognitive function.

In some configurations, the positions reserved for the select set of participants 10A, 10B, 10F, 10G who left the primary communication session 604A for the private communication session 604B can be marked with a graphical indicator, such as the "be right back" indicator shown in FIG. 2B. The graphical indicator indicating the reserved positions can be any suitable visual indicator. A subtle color or shade change may also be used, which can reduce the amount of distractions that may be caused by people leaving the primary communication session.

Figure 2C:
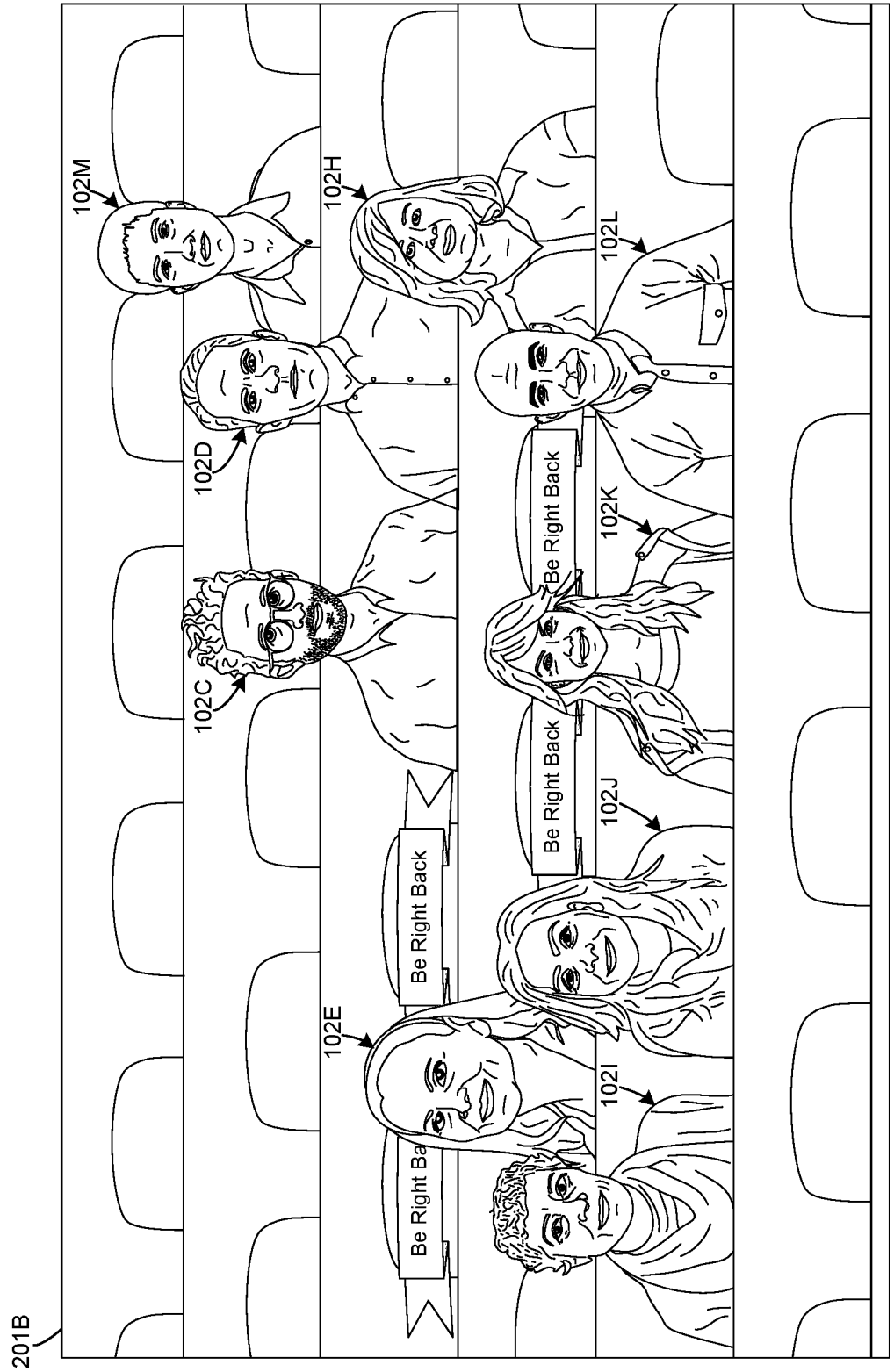
FIG. 2C shows aspects of a Together Mode user interface used for a primary communication session after renderings for users are removed for a private breakout communication session and after a new participant joins the primary communication session.
Figure 2D:
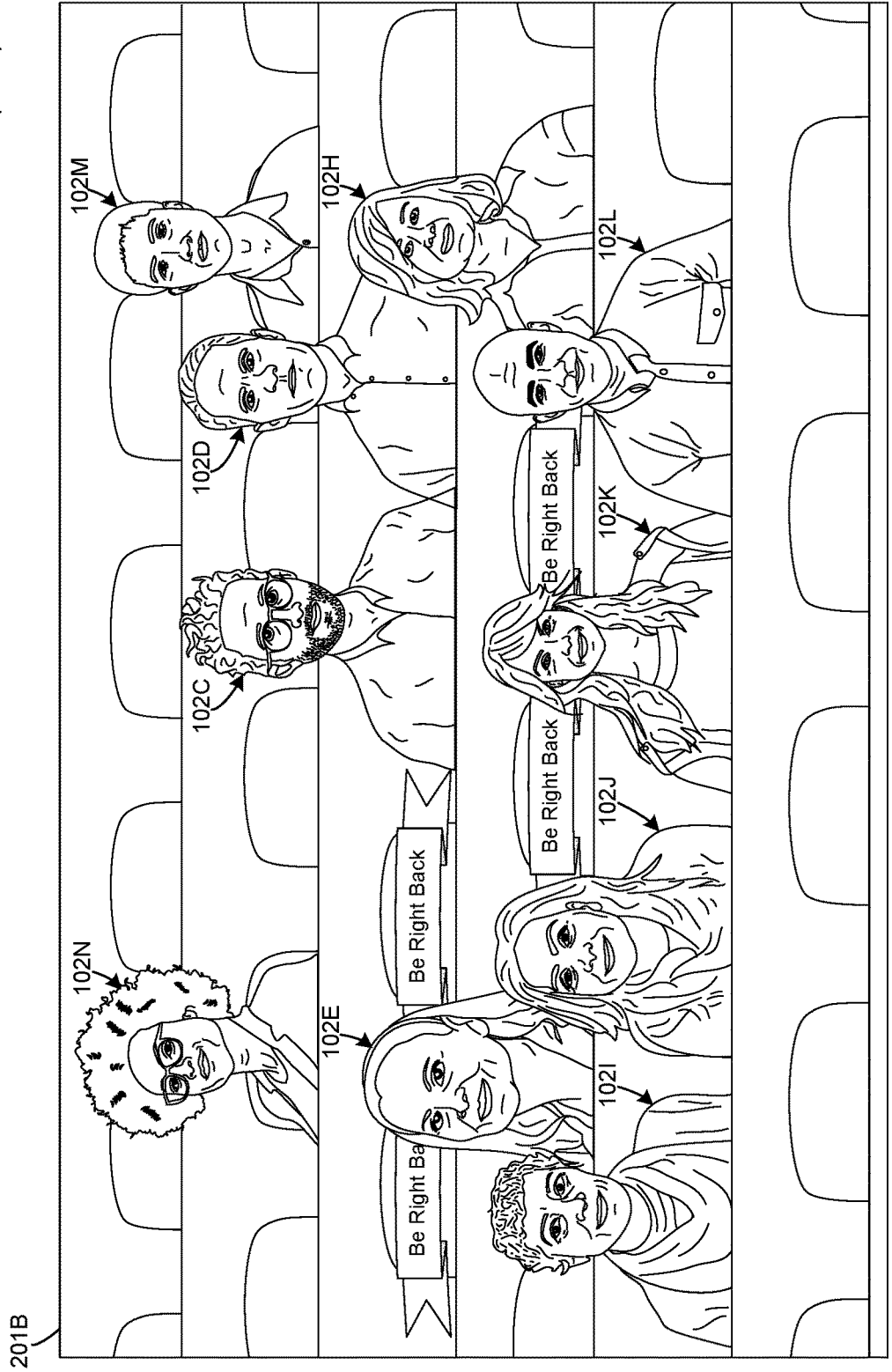
FIG. 2D shows aspects of a Together Mode user interface used for a primary communication session after renderings for users are removed for a private breakout communication session and after another new participant joins the primary communication session.

FIG. 2C shows a scenario where a new user, a thirteenth user 102M, joins the modified primary communication session 604A' while the select set of participants 10A, 10B, 10F, 10G are participating in the private communication session 604B. In this scenario, since the positions of the select set of participants 10A, 10B, 10F, 10G are reserved, the thirteenth user 102M is positioned in a new position, such as the upper right position shown in FIG. 2C. Similarly, as shown in FIG. 2D, another new user, a fourteenth user 102N, joins the modified primary communication session 604A' while the select set of participants 10A, 10B, 10F, 10G are participating in the private communication session 604B. In this example, since the positions of the select set of participants 10A, 10B, 10F, 10G are reserved, the fourteenth user 102N is positioned in another new position, such as the upper left position shown in FIG. 2D.

In some configurations, the system can select a position within a virtual environment for an incoming participant. The selection of a position can be based on a seating policy. A seating policy can define one or more rules that can place individuals in a particular order or in certain locations based on characteristics of each individual. In one illustrative example, a seating policy can define a number of performance metrics and/or ranking levels for employees of a company or organization. A seating policy can also indicate that if an employee has a threshold ranking, that person is to sit in a predetermined location such as a center, middle row seat. The seating policy can also indicate an order in which others are positioned around the employee having the threshold ranking. The order of the other employees can be based on a title and/or a ranking.

Such policies can cause the system to create a seating arrangement where an executive, such as a CEO, is placed in the center of a virtual environment, and then order the other employees around the executive based on their ranking. In such an example, if the highest ranking employee does not meet the threshold level, the system may not apply the seating policy and/or use another policy for employees at other levels.

In another example, a seating policy for a classroom can position certain students having certain performance metrics in a predetermined row and others placed in other positions. The seating policy can also position certain students together based on historical data indicating a level of interaction between the students. This enables the system to position individuals within a particular environment based on an optimization process that utilizes historical performance data. Thus, in addition to accommodating each viewers' natural cognitive brain functions, the system can also accommodate social norms and organizational protocols.

Figure 3A:
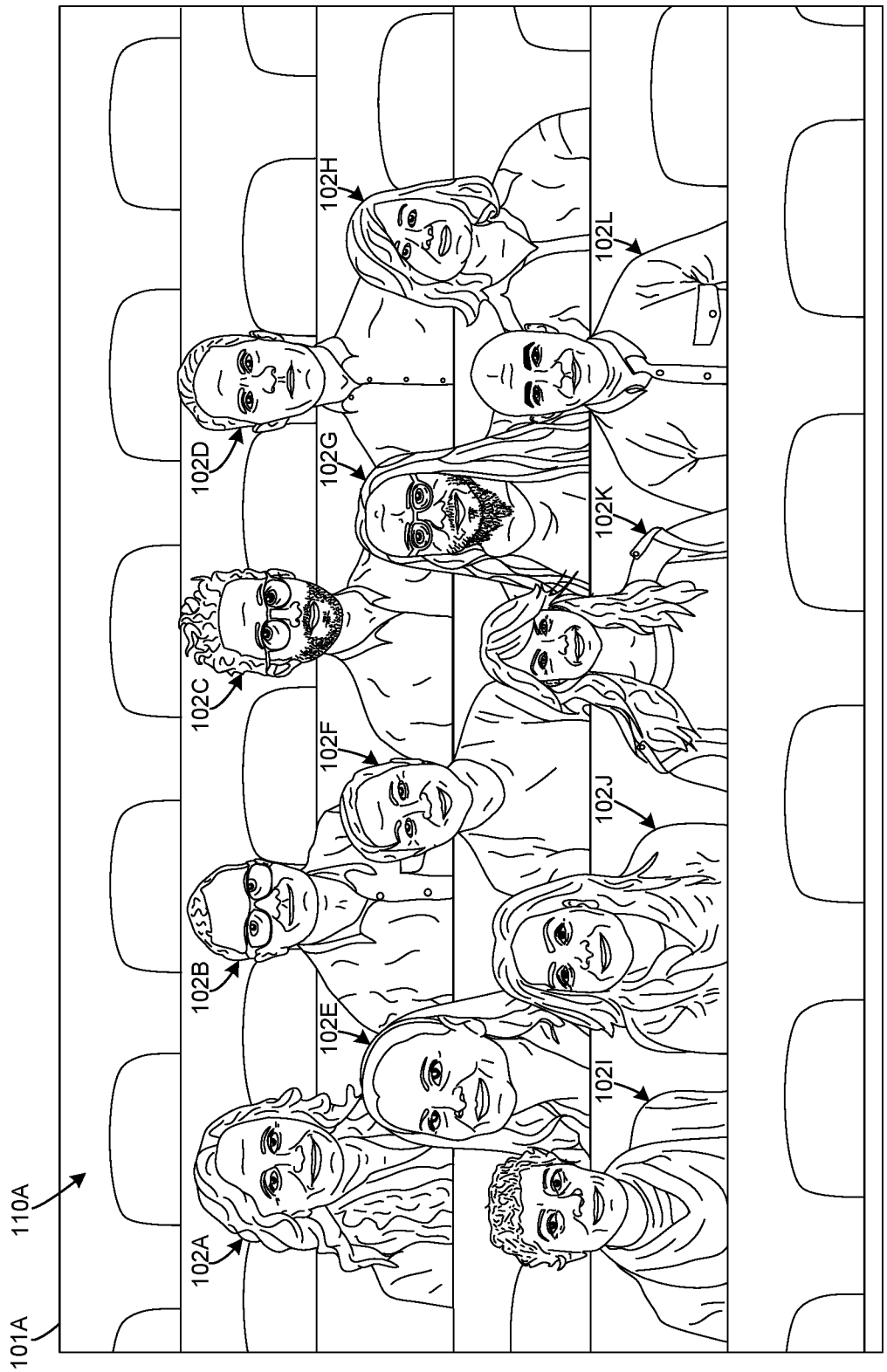
FIG. 3A shows aspects of a Together Mode user interface used for a primary communication session.
Figure 3B:
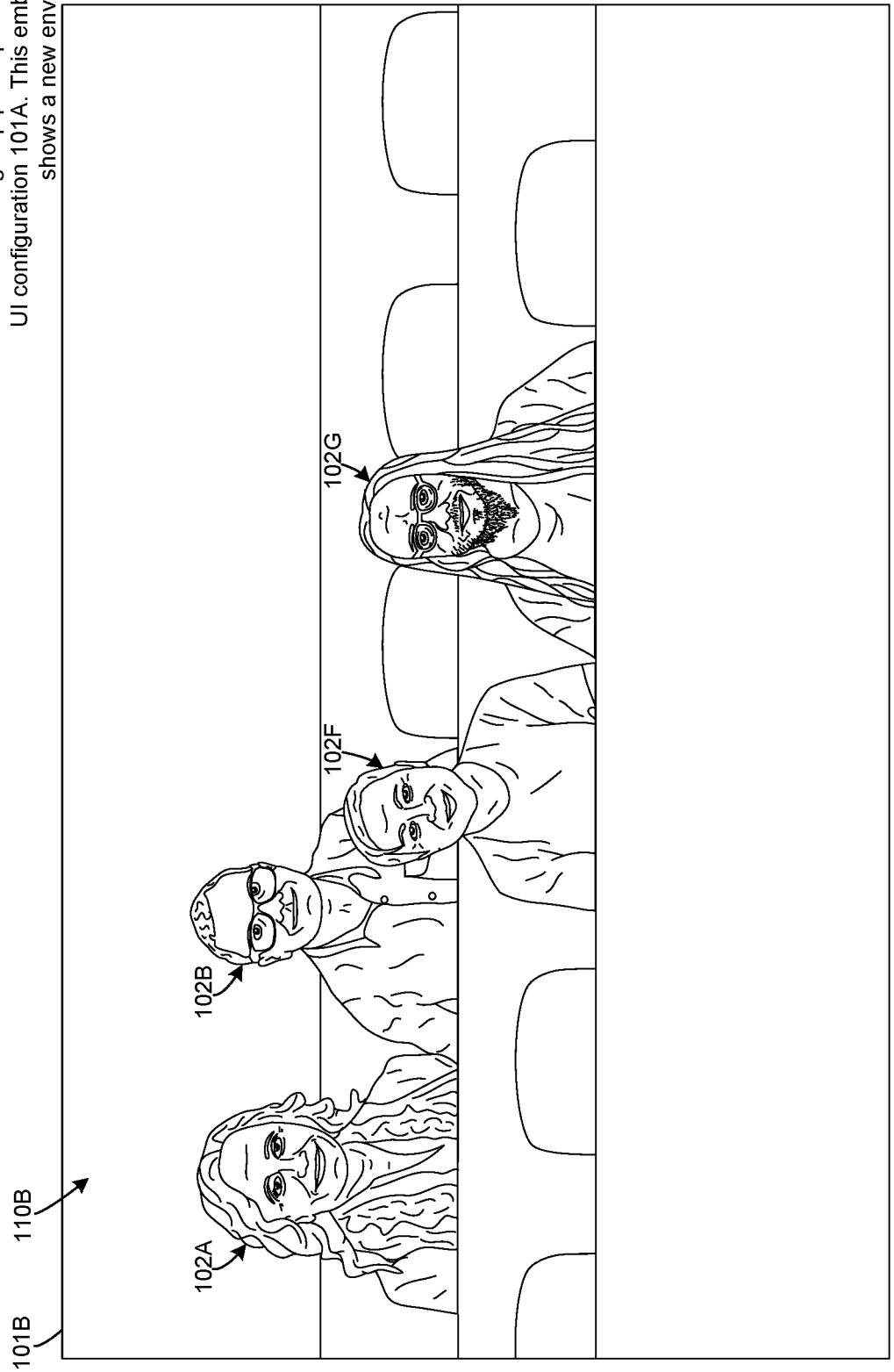
FIG. 3B shows aspects of a Together Mode user interface used for a private breakout communication session that has modified features to give the members of the private breakout communication session a feeling that they have moved to a new room.

The techniques disclosed herein can also change aspects of the virtual environment in response to the transition to a private communication session. An example of this transition is shown in FIG. 3A and FIG. 3B. In this example, while the system maintains the position of the select set of participants for the private communication session, the system changes the look and feel of the virtual environment to provide a visual indicator that the participants have moved to a new room, and a new communication session. An image of a smaller room, for instance, can give the indication that they are in a private meeting. In this example, the virtual environment 110A shown in FIG. 3A has characteristics of a large room that can accommodate a number of participants of a meeting. As shown, there are six rows of seats and more than four seats per row. The virtual environment 110B shown in FIG. 3B has characteristics of a smaller room that can accommodate a subset of the participants.

This type of change can provide a notification that people have moved to a private communication session. At the same time, the changes in the virtual environment can be subtle enough that it does not cause a distraction to the users. This example is provided for illustrative purposes and is not to be construed as limiting. It can be appreciated that other aspects of a virtual environment can be modified. Modifications to a virtual environment can include, but are not limited to, changes in shading, color, or contrast to objects or surfaces in the virtual environment. The modifications can also include, for example, changes to the lighting of a room, changes to the furniture or other depicted fixtures, changes to the number of seats, etc.

Figure 4B:
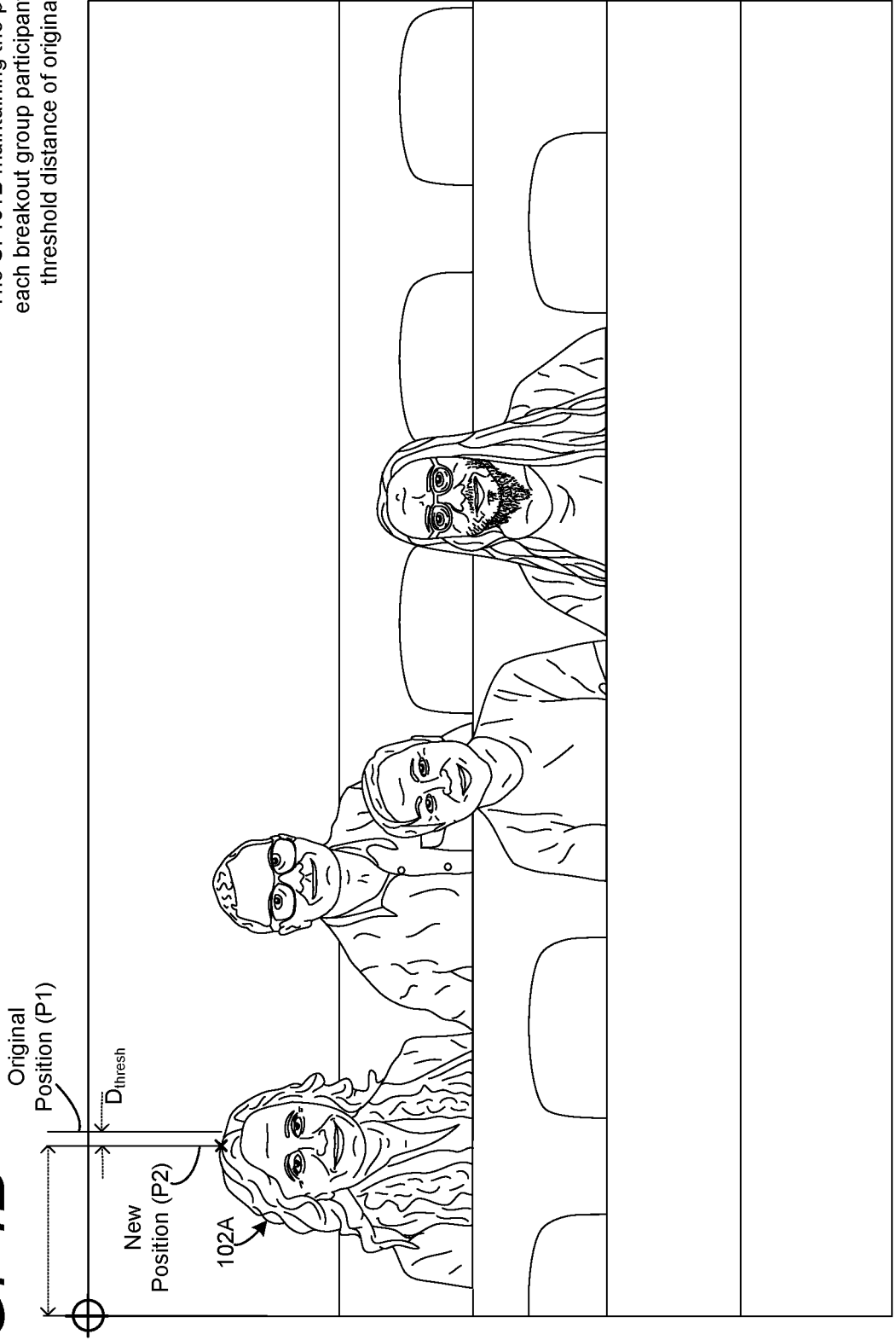
FIG. 4B shows aspects of a Together Mode user interface used for a private breakout communication session and a new position of a user relative to the reference point.

Referring now to FIGS. 4A and 4B additional aspects of a user interface transition are shown and described below. In some configurations, the user interface transitions can maintain the position of the breakout session participants such that the location of each person can be maintained in the same location during a transition between a first UI arrangement and a second UI arrangement. In other embodiments, the user interface transitions can maintain the position of the breakout session participants such that the location of each person can be within a threshold distance between a user's position in a first UI arrangement and the user's position in a second UI arrangement.

The threshold distance can be any suitable distance that enables a viewer to maintain eye contact with the depicted individuals during the transition. Such embodiments enable the system to make slight adjustments to each participants' position between two UI arrangements while also enabling a viewer to readily locate each participant and interpret non-verbal social cues. The example shown in FIGS. 4A and 4B show one example of how a meeting participant's position can be measured. This example shows that a person's position can be measured against a predetermined position within a display screen, e.g., the upper left corner of the display screen. Thus, a UI transition can include a rendering of a person 102A at a first position in a first UI arrangement (FIG. 4A) and a second position in a second UI arrangement (FIG. 4B) that is within a threshold distance (D thresh) of the first position. This example is provided for illustrative purposes and is not to be construed as limiting. It can be appreciated that a person's position can be measured based on any predetermined position within a display screen.

The transition of a user interface can maintain some aspects of a person's position while allowing for adjustments to other aspects of a person's position. For example, in some embodiments, a system can maintain the arrangement, e.g., the relative position, of the breakout session participants throughout the user interface transition, while allowing for slight changes in position. In addition, a transition can allow for slight changes in a person's position while maintaining an order of the breakout session participants and a spacing between the breakout session participants throughout the transition between the primary communication session user interface and the breakout communication session user interface. Thus, a transition that maintains the arrangement of the breakout session participants, and still allows one or more of the breakout session participants to be repositioned during the transition, is still within the scope of the present disclosure.

Figure 5:
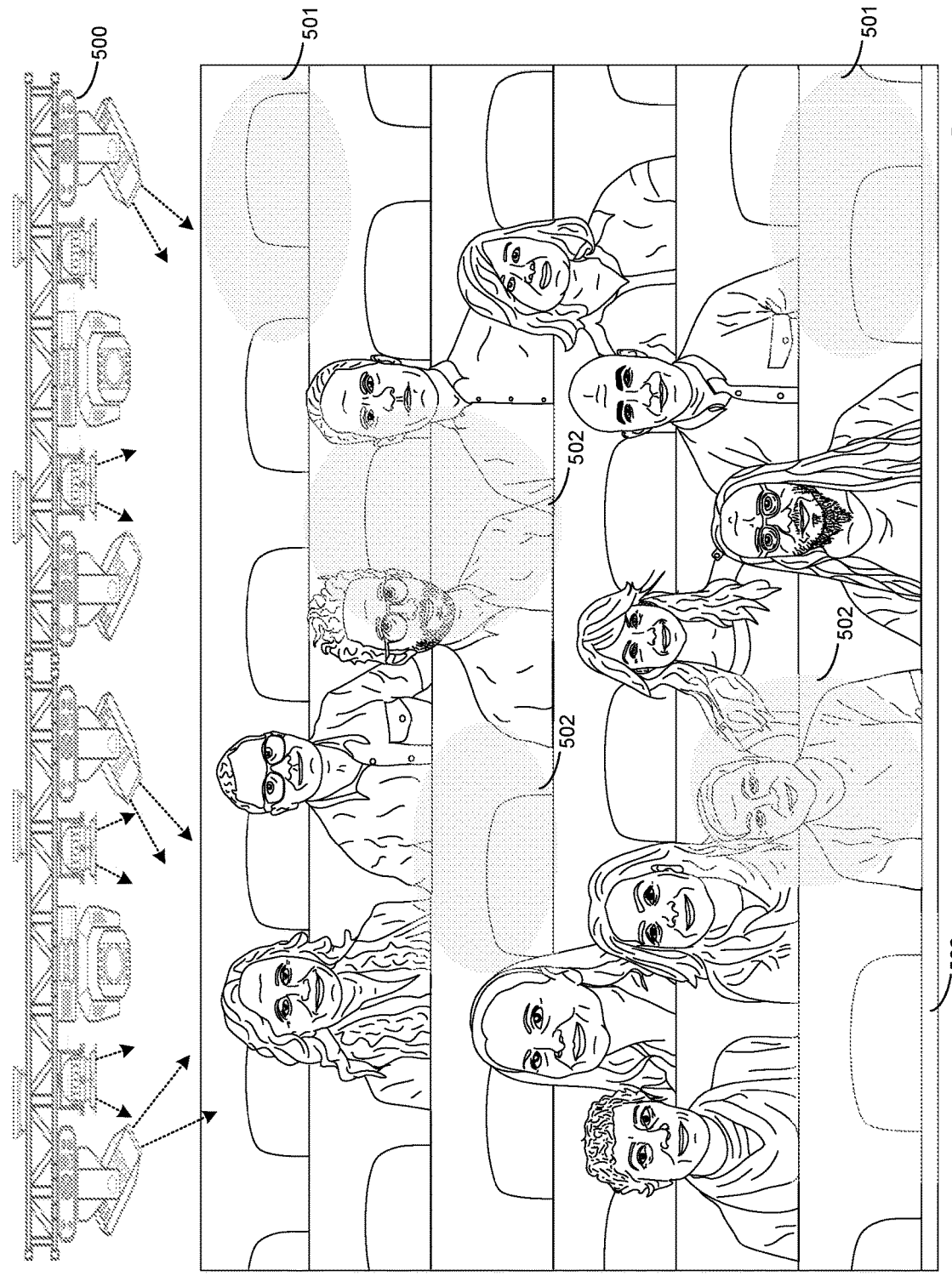
FIG. 5 shows aspects of a Together Mode user interface used for a primary communication session and a lighting scheme that may be applied to a virtual environment to mitigate visual anomalies that may result from videos streams being received from a number of remote computers capturing video data in different physical environments.

Referring now to FIG. 5, aspects involving visual effects of a Together Mode UI are shown and described below. In some configurations, the Together Mode UI can mitigate lighting anomalies that may result from a user interface arrangement that comprises video streams from separate sources. Since the Together Mode user interface comprises a number of video streams from different computers that are in different physical environments, each rendering of each individual may have different lighting characteristics. For instance, some renderings can be brighter than others, and some renderings may have different contrast levels. Instead of using processing power to normalize the display characteristics, e.g., adjust colors and brightness levels of incoming streams, a computing device can generate a virtual lighting scheme within a virtual environment to mask the lighting anomalies. Thus, a communication session user interface, either a main session user interface or a breakout session user interface, can comprise a virtual lighting scheme that creates lighting variations in the virtual environment to mask brightness variations between individual video streams of the video streams of the plurality of participants.

In one Illustrative example, as shown in FIG. 5, a computing device can configure a virtual environment with a virtual lighting apparatus 500 to give the appearance that the virtual environment has a number of spotlights and other light sources that appear to create bright regions 501 and dark regions 502 within the virtual environment. By creating an environment that has visual inconsistencies, e.g., bright regions and dark regions, a system can create a visual background that can help blend different streams having different brightness levels. In some configurations, as shown, a virtual lighting apparatus 500 may be displayed within the virtual environment to allow viewers to readily interpret the source of the lighting inconsistencies. In some embodiments, the Together Mode UI can include various display areas, e.g., areas 501 and 502, having modified display properties, e.g., modified brightness levels, modified contrast levels, modified focus settings, or other special effects that create visual anomalies.

Figure 6:
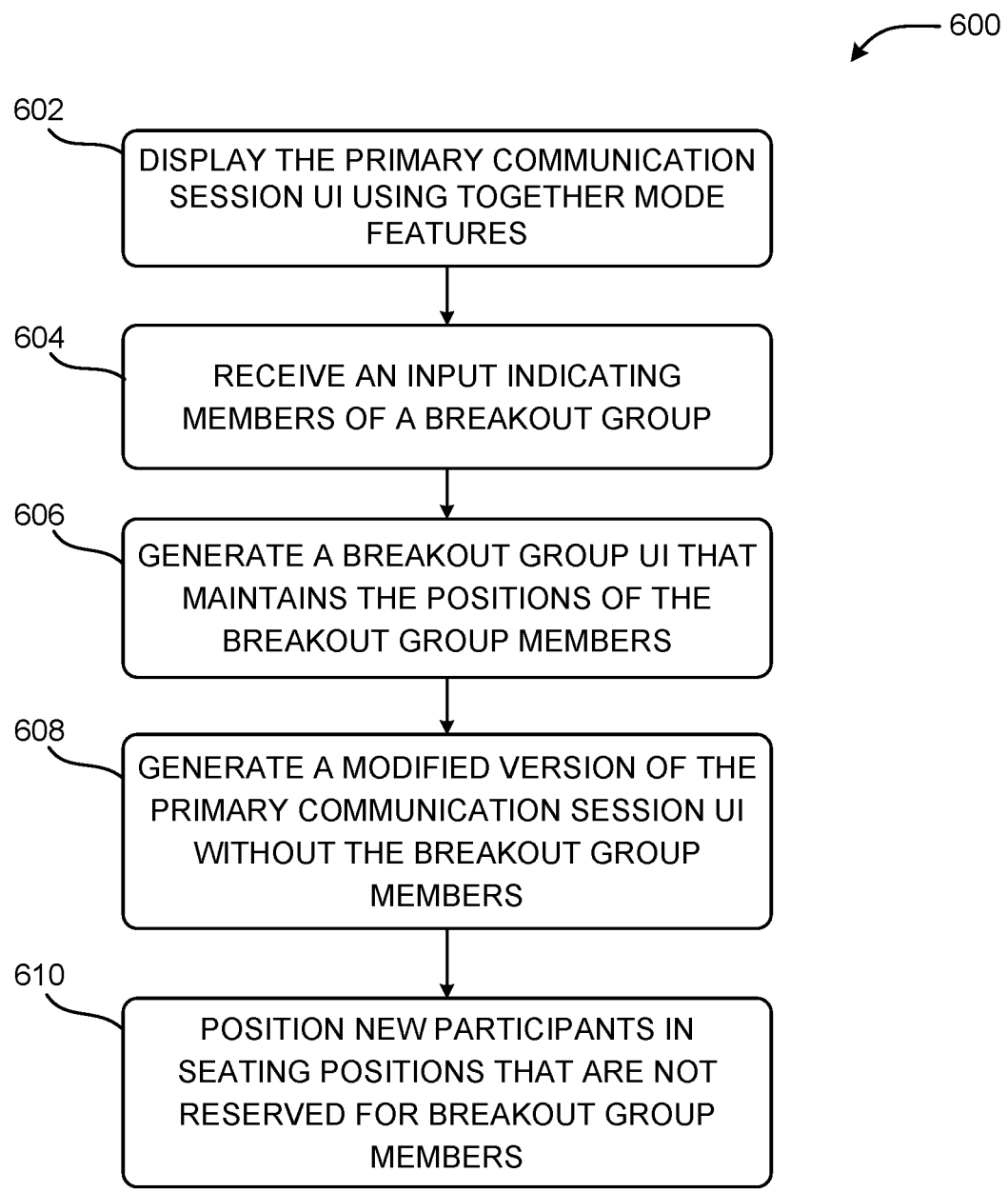
FIG. 6 is a flow diagram showing aspects of a routine for improving user engagement by controlling the position of user renderings during user interface transitions for private breakout communication sessions.

FIG. 6 is a diagram illustrating aspects of a routine 600 for maintaining user engagement during a transition between a primary communication session user interface 101A and a breakout communication session user interface 101B. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or 2 as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 6 and the other FIGURES can be implemented in association with the example presentation user interfaces UI described above. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 600 includes an operation 602 where the system causes one or more computing devices to display of the primary communication session user interface 101A comprising individual renderings 102A-102L of the video streams of a plurality of participants 10A-10L on remote computing devices 11A-11L each associated with the plurality of participants 10A-10L. The individual renderings 102A-102L each have a position relative to a rendering of a seating configuration of a virtual environment 110. The system allows the plurality of participants to communicate through a primary communication session 604A. The virtual environment 110 can also include lighting effects to help mask any lighting anomalies that may result from video streams that are received from separate sources.

The primary communication session user interface, and other user interface arrangements disclosed herein, can be generated by operations for receiving the video streams from the remote computing devices, such as the client devices. The streams can be received by a client device or a server device. The streams can include an image of a person and a background of the person's surrounding environment. The system can apply a processing filter to each of the video streams to remove the background from the image. The system can then conform the video stream such that the video stream can generate a rendering shaped according to the image of the person. The system can also scale the image of each person to a predetermined size for compatibility with the seating configuration of the virtual environment, or to normalize each of the images to give the appearance that each person is in the same room.

Next, at operation 604, the system receives input data indicating a select set of participants to communicate in a private communication session. The select set of participants can be a set of participants such as the first user 10A, second user 10B, sixth user 10F and seventh user 10G. The input data can be from any source such as a user input or a computing device detecting a predetermined condition, such as a receipt of a shared document between a number of people, such as the select set of participants.

Next, at operation 604, the system can cause a subset of the remote computing devices each associated with the select set of participants to exclusively communicate through the private communication session. The private communication session can restrict communication between the select set of participants, and the private communication session can be invoked in response to receiving the input data indicating the select set of participants to communicate in the private communication session. Also, in response to receiving the input data indicating the select set of participants to communicate in the private communication session, the system can cause the remote computing devices each associated with the select set of participants to transition from the display of the primary communication session user interface to the breakout communication session user interface that maintains positions of each rendering of the select set of participants relative to the seating configuration of the virtual environment. The system can control the select set of participants to remain within a threshold distance from their original position as the system transitions the display of the primary communication session user interface to the breakout communication session.

Next, at operation 608, the system can cause the computing devices of the remaining participants, who are not in the private breakout session, to display a modified version of the primary communication session user interface, e.g., the reserved seating user interface 201B, that does not include the select set of participants. This user interface can include graphical indicators, such as a shaded seat or any other graphical element that indicates that a seat or position that was originally occupied by the select set of participants is reserved.

Next, at operation 610, the system can place new participants in other positions or seats other than the positions or seats that were originally occupied by the select set of participants. The new participants that join the communication session can be positioned according to a seating policy that can be used to order or sort participants based on one or more criteria and/or rules.

The technical effects of the routine and other aspects disclosed herein include reducing the amount of bandwidth and computational cycles used by computing systems that provide a communication session for users. This is achieved by the use of the Together Mode features that provide more cohesion to a user group, which leads to improved interaction between each person and their respective computers. Further, by providing controlled user interface transitions for private breakout communication sessions, a system can improve user engagement and reduce user fatigue. This can improve the efficacy of a meeting by allowing users to and avoid the need for additional meetings to discuss missed information, emails requesting missed information, a need for a playback of a recording of a meeting, etc. As a result, the disclosed systems and methods can significantly reduce the use of memory, computing cycles, and bandwidth utilization.

Figure 7:
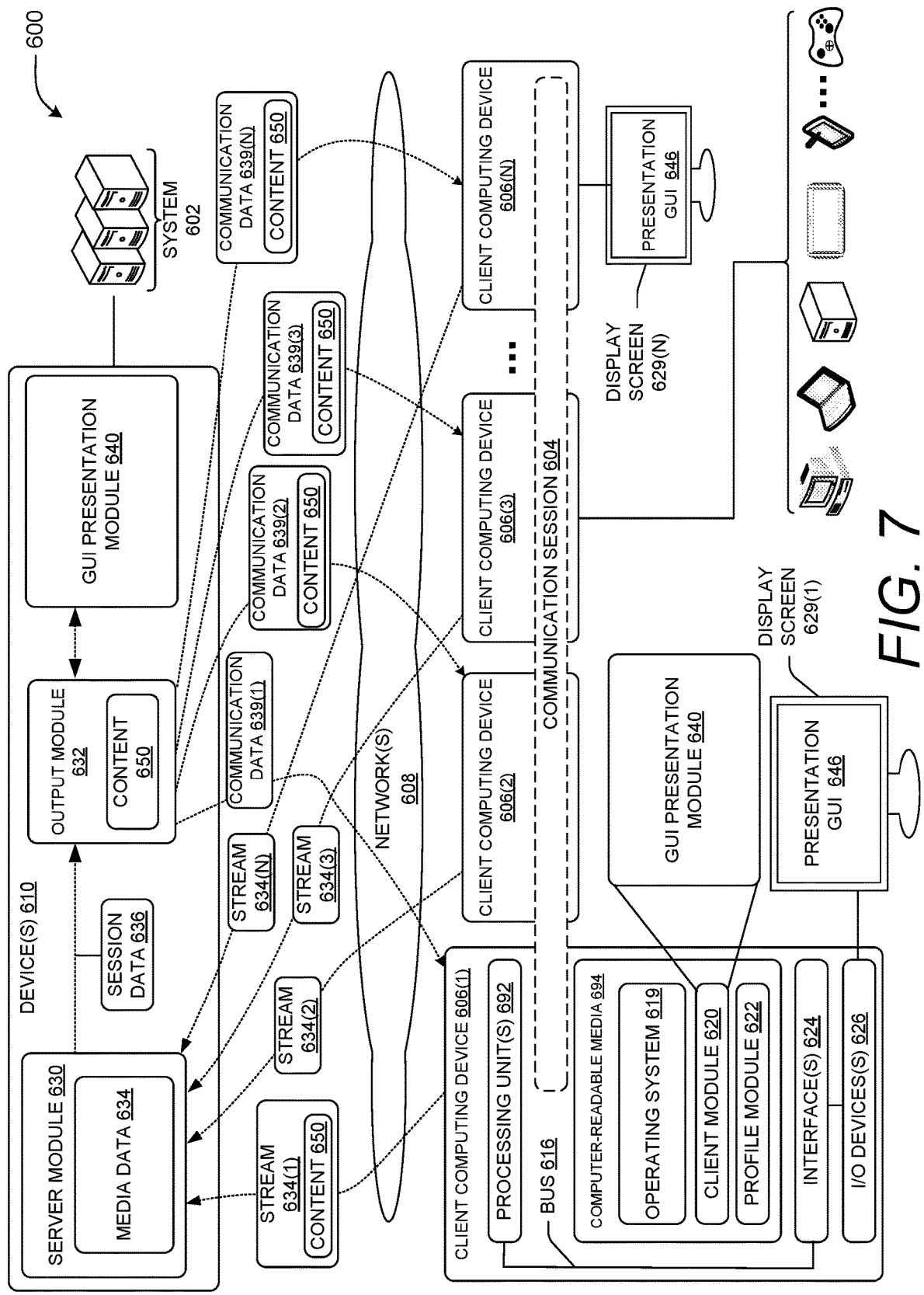
FIG. 7 is a computing system diagram showing aspects of an illustrative operating environment for the techniques disclosed herein.

FIG. 7 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 9 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media

694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 7 illustrates that client computing device 606(1) is in some way connected to a display device (e.g., a display screen 629(N)), which can display a UI according to the techniques described herein.

In the example environment 600 of FIG. 7, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 7) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 7, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 8:
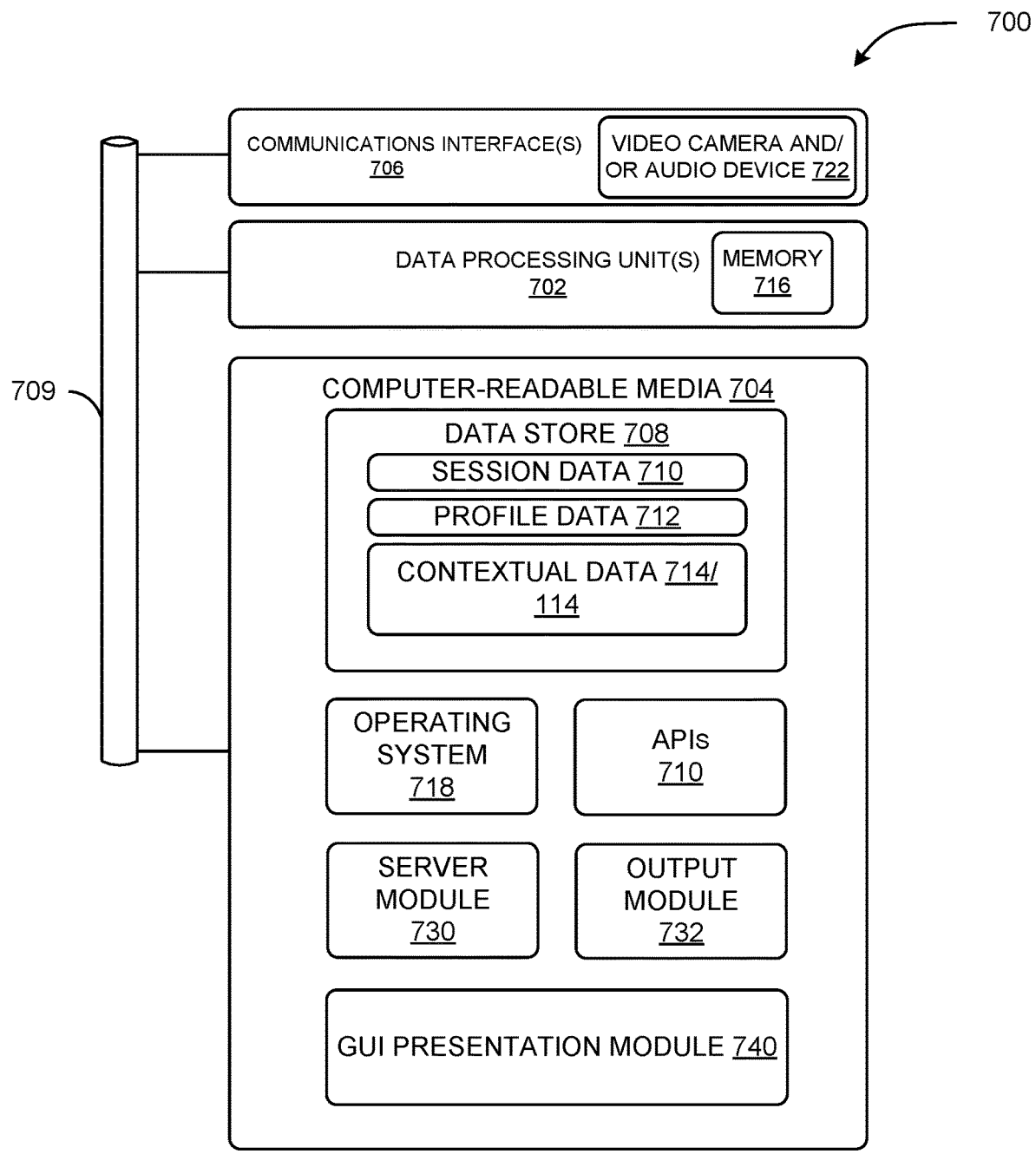
FIG. 8 is a computing architecture diagram showing aspects of the configuration and operation of a computing device that can implement aspects of the techniques disclosed herein.

FIG. 8 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 7), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include contextual data 714, such as the content that includes video, audio, or other content for rendering and display on one or more of the display screens 629. Hardware data 711 can define aspects of any device, such as a number of display screens of a computer. The contextual data 714 can define any type of activity or status related to the individual users 10A-10F each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The following clauses are to supplement the present disclosure.

Example Clause 1. A method for maintaining user engagement during a transition between a primary communication session user interface (101A) and a breakout communication session user interface (101B), the method for execution on a computing system (700) comprising: causing a display of the primary communication session user interface (101A) comprising individual renderings (102A-102L) of the video streams of a plurality of participants (10A-10L) on remote computing devices (11A-11L) each associated with the plurality of participants (10A-10L), wherein the individual renderings (102A-102L) each has a position relative to a seating configuration of a virtual environment (110), wherein the computing system (700) allows the plurality of participants to communicate through a primary communication session (604A); receive input data indicating a select set of participants (10A, 10B, 10F, 10G) to communicate in a private communication session (604B); in response to receiving the input data indicating the select set of participants (10A, 10B, 10F, 10G) to communicate in the private communication session (604B), cause a subset of the remote computing devices (11A, 11B, 11F, 11G) each associated with the select set of participants (10A, 10B, 10F, 10G) to exclusively communicate through the private communication session (604B) and transition from the display of the primary communication session user interface (101A) to the breakout communication session user interface (101B) that maintains positions of each rendering of the select set of participants (10A, 10B, 10F, 10G) relative to the seating configuration of the virtual environment (110).

Example Clause 2. The method of clause 1, wherein the breakout communication session user interface comprises a modification to the virtual environment, wherein the modification comprises at least one of a modification to a lighting scheme, a modification to walls of the virtual environment, a modification to furniture of the virtual environment, or modification to a number of seats.

Example Clause 3. The method of clauses 1 and 2, wherein the transition maintains a position of an individual participant of the select set of participants in the breakout communication session user interface is within a threshold distance of an original position of the individual participant in the primary communication session user interface.

Example Clause 4. The method of clauses 1-3, wherein the transition maintains an arrangement of the select set of participants throughout the transition between the primary communication session user interface and the breakout communication session user interface.

Example Clause 5. The method of clauses 1-4, wherein the transition maintains an order of the select set of participants and a spacing between the select set of participants throughout the transition between the primary communication session user interface and the breakout communication session user interface.

Example Clause 6. The method of clauses 1-5, wherein the primary communication session user interface comprises a virtual lighting scheme that causes a display of lighting variations in the virtual environment to mask brightness variations between individual video streams of the video streams of the plurality of participants.

Example Clause 7. The method of clauses 1-6, wherein the breakout communication session user interface comprises a virtual lighting scheme that causes a display of lighting variations in the virtual environment to mask brightness variations between individual video streams of the video streams of the plurality of participants.

Example Clause 8. The method of clauses 1-7, further comprising: receiving the video streams from the remote computing devices, wherein the video streams each comprise an image of a person and a physical background near the person; applying a processing filter to each of the video streams to remove the background from the image and conforming the video stream configured for a generation of a rendering shaped according to the image of the person; and scaling the image of the person to a predetermined size for compatibility with the seating configuration of the virtual environment.

Example Clause 9. A method for method for maintaining user engagement during a user interface transition a private communication session (604B), the method for execution on a computing system (700) comprising: causing a display of a communication session user interface (201A) comprising individual renderings (102A-102L) of the video streams of a plurality of participants (10A-10L) on remote computing devices (11A-11L) each associated with a respective one of the plurality of participants (10A-10L), wherein the individual renderings (102A-102L) each have a position relative to a seating configuration of a virtual environment (110), wherein the computing system (700) allows the plurality of participants to communicate through a primary communication session (604A); receive input data indicating a select set of participants (10A, 10B, 10F, 10G) to exclusively communicate in a private communication session (604B); in response to receiving the input data indicating the select set of participants (10A, 10B, 10F, 10G) to communicate in the private communication session (604B), causing the select set of participants to exclusively communicate in the private communication session, and cause a subset of the remote computing devices (11C-11E, 11H-11L) each associated with a set of remaining participants (10C-10E, 10H-10L) other than the select set of participants (10A, 10B, 10F, 10G) to transition from the display of the communication session user interface (201A) to a reserved seating user interface (201B) that is configured to remove the renderings of the select set of participants (10A, 10B, 10F, 10G), wherein the reserved seating user interface (201B) is configured to reserve positions occupied by each rendering of the select set of participants (10A, 10B, 10F, 10G) in the communication session user interface (201A).

Example Clause 10. The method of clause 9, wherein the reserved seating user interface comprises a graphical element in positions of each rendering of the select set of participants, wherein the graphical element indicates that one or more seats within the virtual environment are reserved.

Example Clause 11. The method of clauses 9 and 10, wherein the transition from the display of the communication session user interface to the reserved seating user interface maintains positions of each rendering of the remaining participants.

Example Clause 12. The method of clauses 9-11, wherein the reservation of the positions in the reserved seating user interface restricts individual participants of the set of remaining participants from moving a rendering into the positions that are reserved for each rendering of the select set of participants.

Example Clause 13. The method of clauses 9-12, wherein the reservation of the positions in the reserved seating user interface restricts new participants of the primary communication session from locating a rendering in the positions that are reserved for each rendering of the select set of participants.

Example Clause 14. The method of clauses 9-13, further comprising: receiving additional input data identifying at least one participant of the select set of participants returning to the primary communication session; and in response to the additional input data, causing the at least one participant to communicate audio data and video data with the set of remaining participants, and causing a rendering of the at least one participant to transition from a private communication session user interface to the reserved seating user interface, wherein the at least one participant is located in a position where the at least one participant was located in the communication session user interface.

Example Clause 15. The method of clauses 9-14, further comprising: receiving additional input data identifying a new participant to the primary communication session; and modifying the reserved seating user interface to include a rendering of the new participant, wherein a position of the new participant is determined by a seating policy, wherein the policy defines rules or criteria for positioning renderings of one or more participants based on a status or performance metric of the one or more participants.

Example Clause 16. A computing device (700), for maintaining user engagement during a transition between a primary communication session user interface (101A) and a breakout communication session user interface (101B), the computing device (700) comprising: one or more processing units (702); and a computer-readable storage media (704) having encoded thereon computer-executable instructions to cause the one or more processing units (702) to: cause a display of the primary communication session user interface (101A) comprising individual renderings (102A-102L) of the video streams of a plurality of participants (10A-10L) on remote computing devices (11A-11L) each associated with the plurality of participants (10A-10L), wherein the individual renderings (102A-102L) each has a position relative to a seating configuration of a virtual environment (110), wherein the computing system (700) allows the plurality of participants to communicate through a primary communication session (604A); receive input data indicating a select set of participants (10A, 10B, 10F, 10G) to communicate in a private communication session (604B); in response to receiving the input data indicating the select set of participants (10A, 10B, 10F, 10G) to communicate in the private communication session (604B), cause a subset of the remote computing devices (11A, 11B, 11F, 11G) each associated with the select set of participants (10A, 10B, 10F, 10G) to exclusively communicate through the private communication session (604B) and transition from the display of the primary communication session user interface (101A) to the breakout communication session user interface (101B) that maintains positions of each rendering of the select set of participants (10A, 10B, 10F, 10G) relative to the seating configuration of the virtual environment (110).

Example Clause 17. The computing device of clause 16, wherein the breakout communication session user interface comprises a modification to the virtual environment, wherein the modification comprises at least one of a modification to a lighting scheme, a modification to walls of the virtual environment, a modification to furniture of the virtual environment, or modification to a number of seats.

Example Clause 18. The computing device of clauses 16 and 17, wherein the transition maintains a position of an individual participant of the select set of participants in the breakout communication session user interface is within a threshold distance of an original position of the individual participant in the primary communication session user interface.

Example Clause 19. The computing device of clauses 16-18, wherein the transition maintains an arrangement of the select set of participants throughout the transition between the primary communication session user interface and the breakout communication session user interface.

Example Clause 20. The computing device of clauses 16-19, wherein the transition maintains an order of the select set of participants and a spacing between the select set of participants throughout the transition between the primary communication session user interface and the breakout communication session user interface.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for maintaining user engagement during an addition of a new participant to a communication session, the method for execution on a computing system comprising:

causing a display of the communication session user interface comprising individual renderings of the video streams of a plurality of participants on remote computing devices each associated with the plurality of participants, wherein the individual renderings each has a position relative to a seating configuration of a virtual environment, wherein the computing system allows the plurality of participants to communicate through a primary communication session;

receiving an input data identifying the new participant for the communication session; and in response to receiving the input data identifying the new participant for the communication session, causing an insertion of a rendering of the new participant into a location within the seating configuration according to a seating policy, wherein the policy defines rules or criteria for positioning renderings of one or more participants based on a ranking of the one or more participants, wherein a position of the renderings of at least one participant of the one or more participants is associated with a position of a select participant, wherein the position of the least one participant is based on a rank of the at least one participant relative to a rank of the select participant, wherein the position of the new participant is based on the rank of the select participant if the select participant has a ranking that meets a threshold ranking, and if the ranking of the select participant does not meet the threshold ranking, the new participant is not placed in a predetermined position, wherein individual seat positions of the seating configuration are maintained and positions of the plurality of participants of the select set of participants are maintained relative to the individual seat positions during the insertion of the new participant to enhance user interaction with a computing device.

2. The method of claim 1, wherein the new participant is determined to be in a predetermined position relative to the seating configuration if the new participant has a threshold ranking, wherein the computing system does not apply the seating policy to determine a position of the new participant if a rank of the new participant does not meet the threshold ranking, wherein the method further comprises: receiving an indication that other participants have joined the communication session, determine seating positions for the other participants, wherein an order of the seating positions for the other participants relative to the new participant are based on an individual ranking of the other participants.

3. The method of claim 1, wherein the new participant is positioned relative to a predetermined participant based on a rank of the new participant relative to other participants positioned relative to the predetermined participant.

4. The method of claim 1, wherein the ranking of the new participant is based on historical data indicating a level of interaction between other participants of the communication session.

5. The method of claim 1, wherein the communication session user interface comprises a virtual lighting scheme that causes a display of lighting variations in the virtual environment to mask brightness variations between individual video streams of the video streams of the plurality of participants.

6. The method of claim 1, wherein the new participant includes at least one participant, wherein the positions of the at least one participant are ordered relative to the position of the select participant based on the rank of each of the at least one participant relative to the selected participant.

7. The method of claim 1, wherein the position of the select participant is based on the rank of the selected participant if the select participant has a ranking that meets a threshold ranking, and if the ranking of the select participant does not meet the threshold ranking, the select participant is not placed in a predetermined position.

8. The method of claim 1, wherein a selection of the select participant is based on the rank of the selected participant meeting a threshold, and if rank of the rank of the selected participant does not meet the threshold, the seating policy is not applied to the selected participant or the new participant.

9. A computing device for maintaining user engagement during an addition of a new participant to a communication session, the computing device comprising:
one or more processing units; and
a computer-readable storage media having encoded thereon computer-executable instructions to cause the one or more processing units to:
cause a display of the communication session user interface comprising individual renderings of the video streams of a plurality of participants on remote computing devices each associated with the plurality of participants, wherein the individual renderings each has a position relative to a seating configuration of a virtual environment, wherein the computing system allows the plurality of participants to communicate through a primary communication session;
receive an input data identifying the new participant for the communication session; and
in response to receiving the input data identifying the new participant for the communication session, cause an insertion of a rendering of the new participant into a location within the seating configuration according to a seating policy, wherein the policy defines rules or criteria for positioning renderings of one or more participants based on a ranking of the one or more participants, wherein a position of the renderings of the new participant is associated with a position of a select participant, wherein the position of the new participant is based on a rank of the new participant relative to a rank of the select participant, wherein the position of the new participant is based on the rank of the select participant if the select participant has a ranking that meets a threshold ranking, and if the ranking of the select participant does not meet the threshold ranking, the new participant is not placed in a predetermined position, wherein individual seat positions of the seating configuration are maintained and positions of the plurality of participants are maintained relative to the individual seat positions during the insertion of the new participant to enhance user interaction with a computing device.

10. The computing device of claim 9, wherein the new participant is determined to be in a predetermined position relative to the seating configuration if the new participant has a threshold ranking, wherein the computing system does not apply the seating policy to determine a position of the new participant if a rank of the new participant does not meet the threshold ranking, wherein the instructions further cause the one or more processing units to receive an indication that other participants have joined the communication session, determine seating positions for the other participants, wherein an order of the seating positions for the other participants relative to the new participant are based on an individual ranking of the other participants.

11. The computing device of claim 9, wherein the new participant is positioned relative to a predetermined participant based on a rank of the new participant relative to other participants positioned relative to the predetermined participant.

12. The computing device of claim 9, wherein the ranking of the new participant is based on historical data indicating a level of interaction between other participants of the communication session.

13. The computing device of claim 9, wherein the communication session user interface comprises a virtual lighting scheme that causes a display of lighting variations in the virtual environment to mask brightness variations between individual video streams of the video streams of the plurality of participants.

14. A computer-readable storage device having encoded thereon computer-executable instructions for maintaining user engagement during an addition of a new participant to a communication session, wherein the computer-executable instructions cause one or more processing units of a system to:

cause a display of the communication session user interface comprising individual renderings of the video streams of a plurality of participants on remote computing devices each associated with the plurality of participants, wherein the individual renderings each has a position relative to a seating configuration of a virtual environment, wherein the computing system allows the plurality of participants to communicate through a primary communication session;

receive an input data identifying the new participant for the communication session; and in response to receiving the input data identifying the new participant for the communication session, cause an insertion of a rendering of the new participant into a location within the seating configuration according to a seating policy, wherein the policy defines rules or criteria for positioning renderings of one or more participants based on a ranking of the one or more participants, wherein a position of the renderings of the new participant is associated with a position of a select participant, wherein the position of the new participant is based on a rank of the new participant relative to a rank of the select participant, wherein the position of the new participant is based on the rank of the select participant if the select participant has a ranking that meets a threshold ranking, and if the ranking of the select participant does not meet the threshold ranking, the new participant is not placed in a predetermined position, wherein individual seat positions of the seating configuration are maintained and positions of the plurality of participants are maintained relative to the individual seat positions during the insertion of the new participant to enhance user interaction with a computing device.

15. The computer-readable storage device 14, wherein the new participant is determined to be in a predetermined position relative to the seating configuration if the new participant has a threshold ranking, wherein the computing system does not apply the seating policy to determine a position of the new participant if a rank of the new participant does not meet the threshold ranking, wherein the instructions further cause the one or more processing units to receive an indication that other participants have joined the communication session, determine seating positions for the other participants, wherein an order of the seating positions for the other participants relative to the new participant are based on an individual ranking of the other participants.

16. The computer-readable storage device 14, wherein the new participant is positioned relative to a predetermined participant based on a rank of the new participant relative to other participants positioned relative to the predetermined participant.

17. The computer-readable storage device 14, wherein the ranking of the new participant is based on historical data indicating a level of interaction between other participants of the communication session.

\* \* \* \* \*